(12) United States Patent
Neumann

(10) Patent No.: US 7,854,463 B1
(45) Date of Patent: Dec. 21, 2010

(54) VEHICLE OPERATOR ENCLOSURE

(76) Inventor: Jason E. Neumann, 13230 Stewart Ave., Norwood, MN (US) 55368

( * ) Notice: Subject to any disclaimer, the term of this patent is extended or adjusted under 35 U.S.C. 154(b) by 38 days.

(21) Appl. No.: 12/313,994

(22) Filed: Nov. 28, 2008

Related U.S. Application Data

(60) Provisional application No. 61/197,118, filed on Oct. 24, 2008.

(51) Int. Cl.
*B60J 11/04* (2006.01)
(52) U.S. Cl. ............................. 296/83; 296/79; 296/144
(58) Field of Classification Search .................. 296/79, 296/80, 82, 83, 145, 144; 135/88.09; 280/DIG. 5
See application file for complete search history.

(56) References Cited

U.S. PATENT DOCUMENTS

| | | | |
|---|---|---|---|
| 2,826,450 A | * | 3/1958 | Williams .................. 296/77.1 |
| 3,414,316 A | | 12/1968 | Williams et al. |
| 3,610,677 A | | 10/1971 | Hawley et al. |
| 4,098,536 A | | 7/1978 | Mills |
| 4,336,964 A | * | 6/1982 | Pivar .......................... 296/78.1 |
| 4,773,694 A | | 9/1988 | Gerber |
| 6,279,986 B1 | | 8/2001 | Hinsperger |
| 6,402,220 B2 | | 6/2002 | Allen |
| 6,419,303 B1 | | 7/2002 | Fleming |
| 6,543,830 B1 | | 4/2003 | Stuck |
| 6,811,204 B2 | * | 11/2004 | Long ............................ 296/79 |
| 7,213,864 B2 | * | 5/2007 | Gasper ......................... 296/83 |

\* cited by examiner

*Primary Examiner*—Lori L Lyjak
(74) *Attorney, Agent, or Firm*—Richard John Bartz

(57) ABSTRACT

A garden tractor is equipped with an enclosure for protecting the tractor's operator from the weather, dust, dirt, insects and sunlight. A frame assembly mounted on the tractor supports an enclosure having panels with transparent windows and a door to allow the tractor's operator to enter and exit the enclosure.

25 Claims, 11 Drawing Sheets

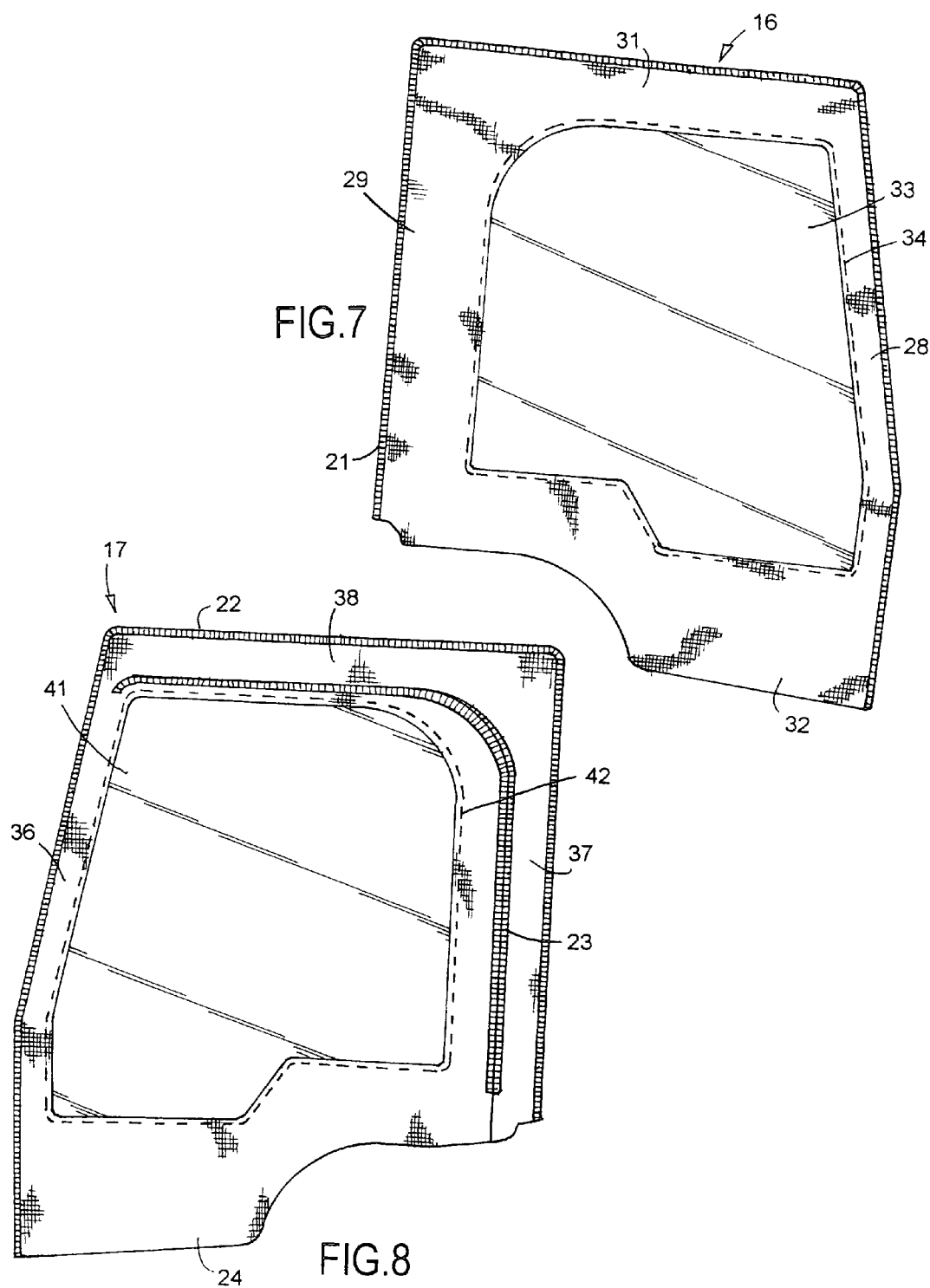

VEHICLE OPERATOR ENCLOSURE

CROSS REFERENCE TO RELATED APPLICATION

This application claims the priority of U.S. Provisional Patent Application Ser. No. 61/197,118 filed Oct. 24, 2008.

FIELD OF THE INVENTION

The invention is in the art of environment and weather enclosures and cabs for motor vehicles, such as garden and lawn tractors, all terrain vehicles and golf carts.

BACKGROUND OF THE INVENTION

Garden and lawn tractors have been equipped with enclosures and cabs to protect the tractor operators from adverse environment conditions, such as sunlight, rain, sleet, snow, dust, dirt and insects. When these tractors are used with snow blowers, the enclosures protect the tractor operators from cold temperatures, blowing and swirling snow and ice. Some tractor cabs have rigid upright walls with windows and a roof secured to the upper portions of the walls. The upright walls include one or more hinged doors to permit the tractor operator to enter and exit from the cabs. These cabs are not designed to be readily mounted on and removed from the tractor. Other tractor cabs have frame structures mounted on the tractor and flexible material fitted over the frame structure to protect the tractor operator. Examples of cabs for lawn and garden tractors are elucidated in the following U.S. Patents.

O. S. Williams and R. S. Williams in U.S. Pat. No. 3,414,316 provides a weather protection cab for a garden tractor attached to a snow thrower. The cab has a pair of self-closing flexible closures for openings to accommodate tractor control levers and upright corner members supporting a roof. The flexible closures extend downward from the front of the cab adjacent opposite sides of the tractor's hood.

B. F. Hawley in U.S. Pat. No. 3,610,677 discloses a cab for use with a tractor to protect the operator from the weather. The cab has rigid front and rear panels joined to a rigid roof. The front and rear panels are sheet metal members having windows. Flexible side panels with windows are curtains extended between the side edges of the front panel, rear panel and roof. The cab can be removed from the tractor. Alternatively, the side curtains can be removed from the front and rear panels and roof when these rigid panels and roof are retained on the tractor.

P. Hinsperger in U.S. Pat. No. 6,279,986 describes a lawn tractor with a personal enclosure to protect an operator from insects and airborne objects. The enclosure is located over a frame structure that can be fastened to a lawn tractor without drilling holes or making permanent modifications to the tractor. The enclosure comprises netting or flexible material for preventing the passage of airborne elements. A zipper on one side of the enclosure separates this side of the enclosure to allow the operator to enter and exit the enclosure maintained on the tractor with the frame structure.

SUMMARY OF THE INVENTION

The invention is an enclosure or cab for a motor vehicle, such as a garden or lawn tractor, to protect the vehicle's operator from the weather, dust, dirt, pollen, insects and sunlight. A frame assembly mounted to the tractor supports the enclosure. The frame assembly has tubular members releasably assembled to connectors which allows the frame assembly to be readily assembled and taken apart. The enclosure has one piece front, top and rear panel that connects with releasable fasteners, such as zippers, to side panels. The front, rear and side panels include transparent windows. One or both side panels have a releasable fastener, such as a zipper, providing a door to allow the vehicle operator to enter and exit from the inside of the enclosure.

One embodiment of the invention comprises a frame assembly adapted to be mounted on a garden or lawn tractor and an enclosure supported on the frame assembly. The frame assembly has a plurality of interconnected members including upright front members, horizontal top members, upright rear members releasably secured together with connectors. The members are tubes telescoped into tubular connectors. Mounts connected to the front member and rear members are used to attach the frame assembly to the tractor. The enclosure supported on the front, top and rear frame members provides an enclosed space or compartment to accommodate the operator of the tractor. The enclosure has front, top and rear panels of a flexible sheet material, such as sheet plastic, vinyl plastic or other types of sheet materials, located over the front, top and rear frame members. The front and rear panels have transparent windows to provide the operator with a clear view of the surrounding environment. The front panel also has downwardly extensions with windows located adjacent opposite sides of the tractor's hood. The enclosure is completed with side panels attached with releasable fasteners, such as zippers, to the front, top and rear panels. The side panels and front, top and rear panels have adjacent outer edges joined to the releasable fasteners which retain the enclosure in a general box-like shape on the frame assembly. An additional releasable fastener, such as a zipper, in one of the side panels provides the side panel with a door to allow the operator to enter and exit from the enclosure. Each of the side panels can be provided with releasable fasteners for doors. Each side panel has a transparent window. The releasable fasteners are manually operable zippers that allow easy and quick installation and removal of the enclosure from the frame assembly without requiring modification, drilling or cutting of the enclosure panels. The frame assembly is mountable on the tractor without modifying or minimally changing the structure of the tractor.

DESCRIPTION OF THE DRAWING

FIG. 7 is a side elevational view of the right side panel of the enclosure of FIG. 1;

FIG. 8 is a side elevational view of the left side panel of the enclosure of FIG. 1;

DESCRIPTION OF THE INVENTION

Figure 1:
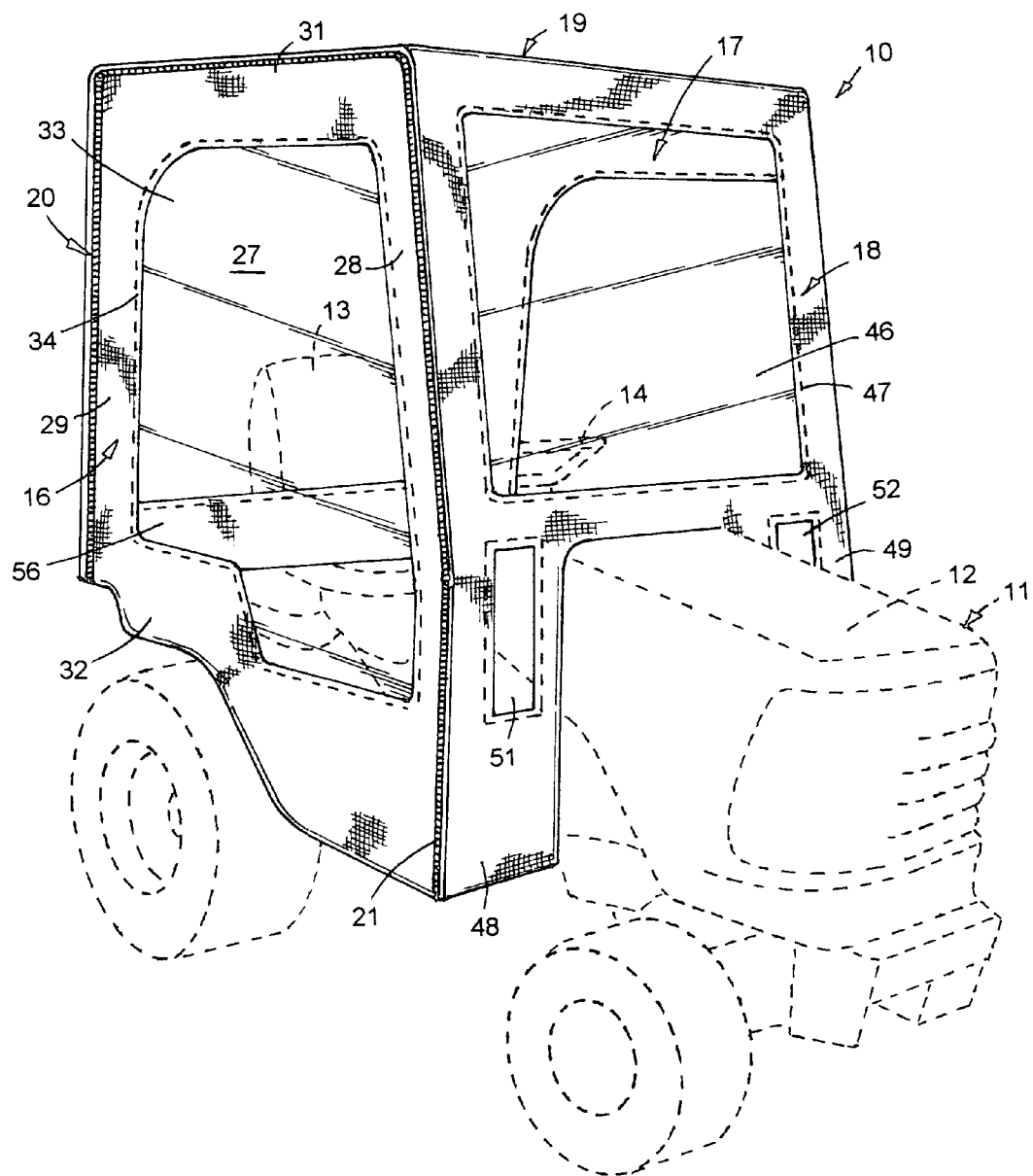
FIG. 1 is a perspective view of the enclosure of the invention for a garden tractor shown in broken lines.

A personal enclosure or cab 10, shown in FIGS. 1 to 5, is mounted on a motor vehicle 11, illustrated in broken lines as a lawn or garden tractor. An example of vehicle 11 is a John Deere garden tractor marketed by the John Deere Company of Moline, Ill. Other models and types of tractors including motorized golf carts, utility vehicles and all terrain vehicles can be equipped with personal enclosures according to enclosure 10. Vehicle 11, shown in broken lines as a conventional garden tractor, is not part of the invention. Vehicle 11 has a hood 12 covering an internal combination engine or an electric motor operable to drive the vehicle's wheels. An operator or driver seat 13 and steering wheel 14 located behind hood 12 is used by the operator to control the operation of vehicle 11. The operator when in seat 13 is in a space or compartment in front of steering wheel 14 and normally exposed to the weather and ambient environmental conditions, such as cold temperatures, rain, hail, snow, ice, wind, dust, dirt, pollen, insects and ultraviolet sunlight. Enclosure 10 also shields the operator in seat 13 from adverse weather and ambient environmental conditions without materially inferring with the operator's vision and ability to control and operate vehicle 11.

Enclosure 10 comprises a plurality of panels connected together retained on a frame assembly 26 mounted on tractor 11. Enclosure 10 has first and second side panels 16 and 17 releasably connected to front, top and rear panels 18, 19 and 20. A first releasable connector 21, shown in FIGS. 1 and 2, joins the outer peripheral edges of side panel 16 to the adjacent edges of front, top and rear panels 18, 19 and 20. A second releasable connector 22, shown in FIG. 3, joins the outer peripheral edges of side panel 17 to the adjacent edges of front, top and rear panels 18, 19 and 20. Releasable connectors 21 and 22 maintain enclosure 10 in a generally box-like shape on a frame assembly indicated generally at 26 in FIG. 10 over and around the space adjacent and above for a vehicle operator on seat 14. A third releasable connector 23, shown in FIG. 3, is located inwardly and generally parallel to the rear and top sections of releasable connector 22 to provide panel 17 with a door section 24 that can be folded open to allow the vehicle's operator to enter and exit the enclosure compartment 27 surrounded by panels 16 to 20. The generally vertical portion of side panel 17 below the terminal end of connector is a flexible live hinge that allows door section 24 to be moved between open and closed positions. FIG. 3 shows door section 24 in the closed position. Side panel 16 can also be provided with another releasable connector providing a door. Releasable connectors 21, 22 and 23 are devices for joining two pieces of sheet materials consisting of two parallel rows of parts interlocked by the motion of a slide, commonly known as zippers. Other types of releasable connectors including but not limited to hook and loop fasteners and tongue and groove fasteners can be used to secure side panels 16 and 17 to panels 18 to 20. Fasteners, such as stitches, secure the zippers to panels 16 to 20.

Figure 2:
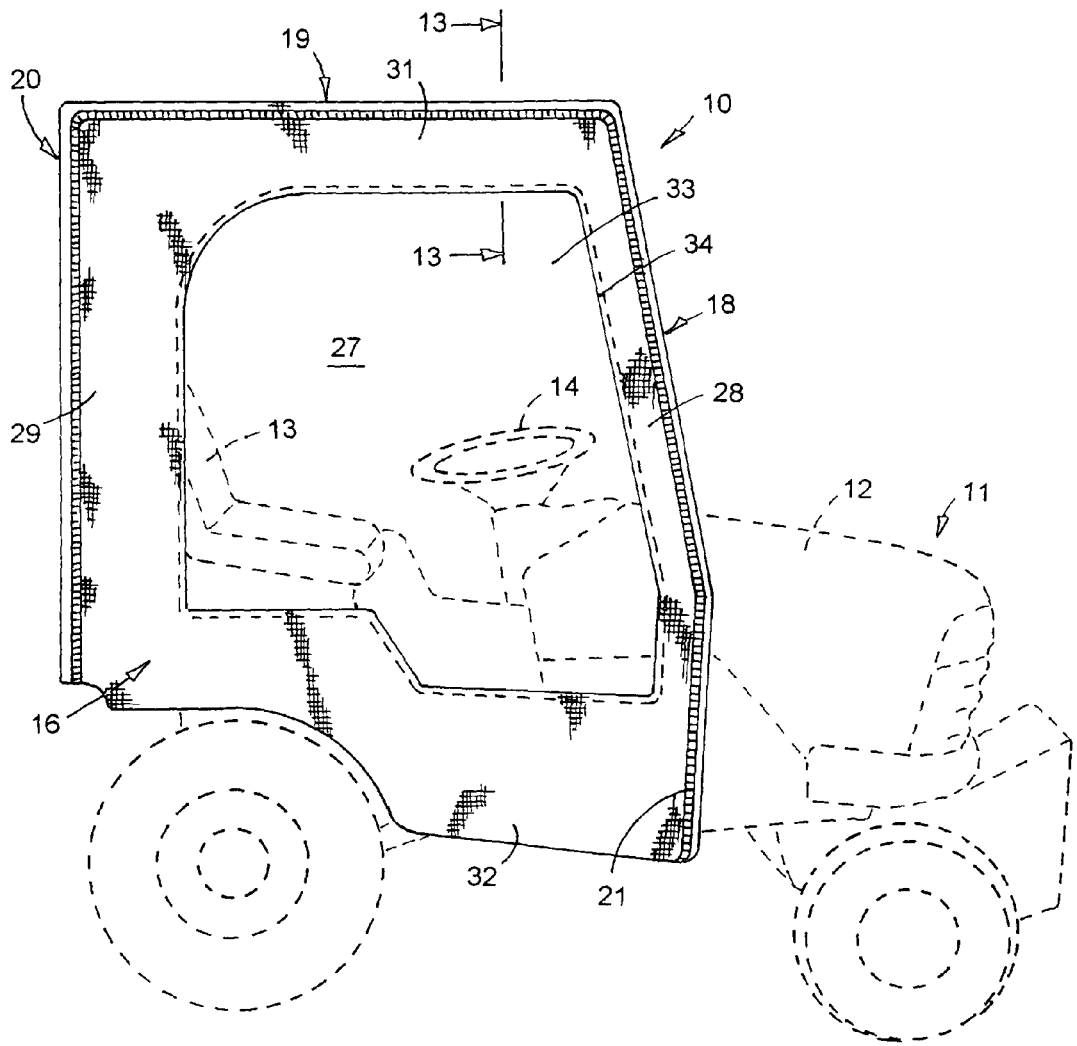
FIG. 2 is a side elevational view of the right side thereof.
Figure 3:
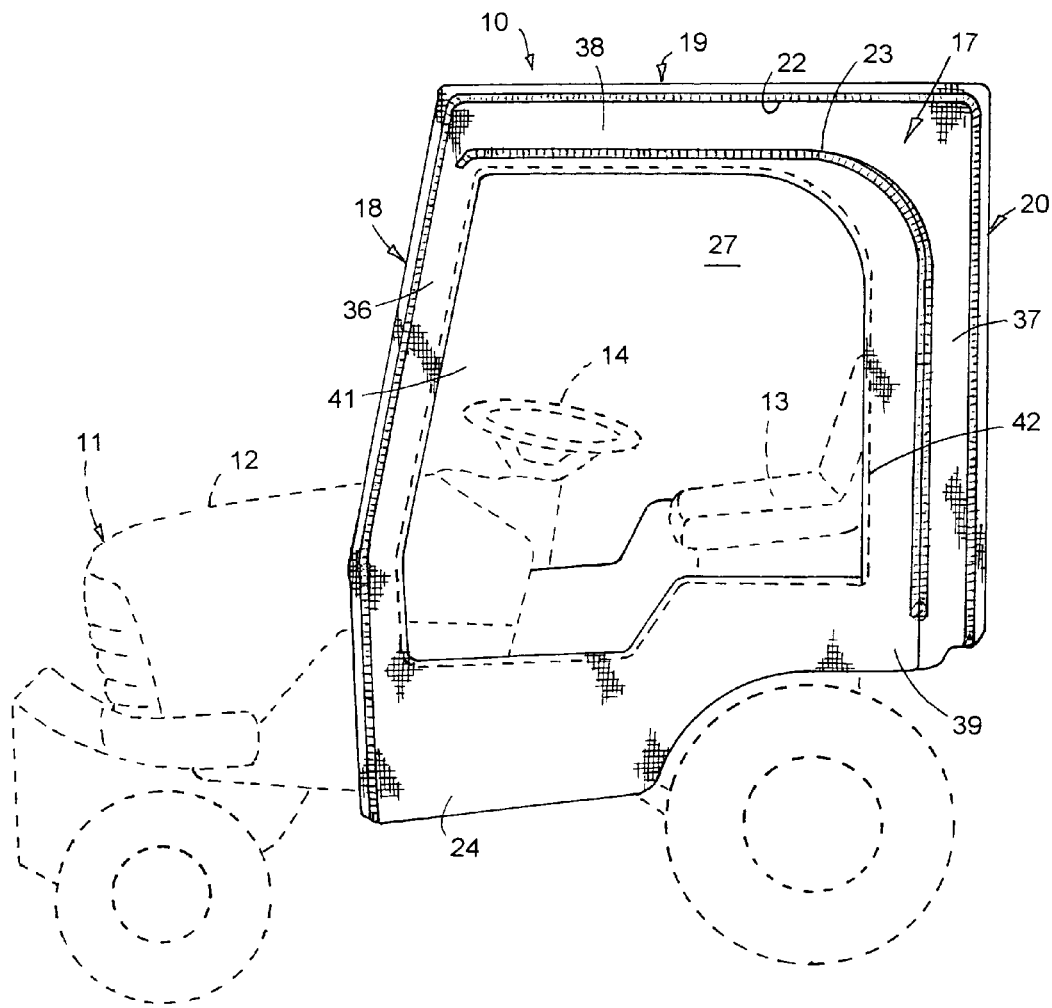
FIG. 3 is a side elevational view of the left side thereof.

Side panel 16, shown in FIGS. 1, 2 and 7, has upright side sections 28 and 29 joined to top and bottom sections 31 and 32. Panel sections 28, 29, 31 and 32 are flexible vinyl plastic sheet members that surround a side window 33 of transparent sheet plastic. The panels sections of panels 16 to 20 can be made from environmentally compatible materials, such as bamboo, straw, switch grass, seaweed and hemp fabrics and recyclable polypropylene. Examples of natural cellulose fibers for textiles are disclosed by Y. Yang in U.S. Patent Application Publication No. 2007/0199669. Fasteners 34, shown as stitches, secure the outer peripheral edges of window 33 to panel sections 28, 29, 31 and 32. Other types of fasteners including but limited to adhesives and heat seals can be used to secure window 33 to panel sections 28, 29, 31 and 32.

Side panel 17, shown in FIGS. 3 and 8, has side sections 36 and 37 joined to top and bottom sections 38 and 39. Fastener 22 is secured to the outer peripheral edges of panel sections 36 to 39. Door section 24 surrounds a side window 41 of transparent sheet plastic. Fasteners 42, shown as stitches, secure window 41 to door section 24. The vertical portion of door section 24 are a one-piece flexible material, such as vinyl plastic, other materials such as cloth and canvas can be used for panel sections 36 to 39 and door section 24.

Figure 4:
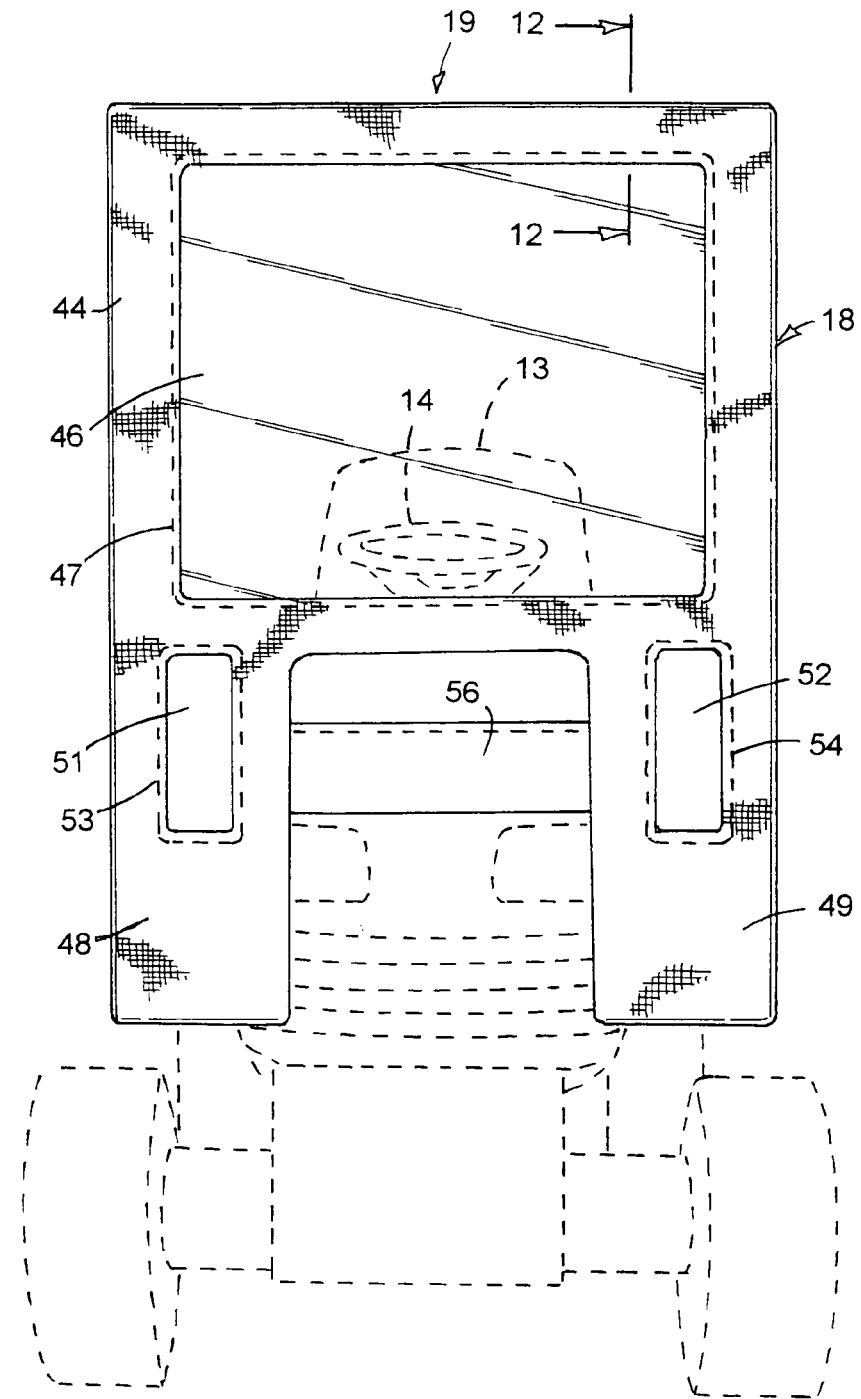
FIG. 4 is a front elevational view thereof.

Front panel 18, shown in FIG. 4, has a generally square panel section 44 surrounding a front window 46. Fasteners 47, shown as stitches, secure window 46 to panel section 44. Other types of fasteners can be used to secure window 46 to panel section 44. Window 46 is located in front of the vehicle's steering wheel 14 and above hood 12. Panel 18 has a pair of downwardly extended rectangular panel sections 48 and 49 joined to the bottom portion of square panel section 44. Sections 48 and 49 are located adjacent opposite sides of the vehicles hood 12. Inner edges of sections 48 and 49 are contoured to engage opposite sides and top of hood 12 to prevent wind, snow, dirt and dust from flowing into enclosure compartment 27. Panel sections 48 and 49 has upright rectangular windows 51 and 52 of transparent plastic sheet material secured to sections 48 and 49 with fasteners 53 and 54, shown as stitches. Other types of fasteners can be used to secure windows 51 and 52 to panel sections 48 and 49.

Figure 5:
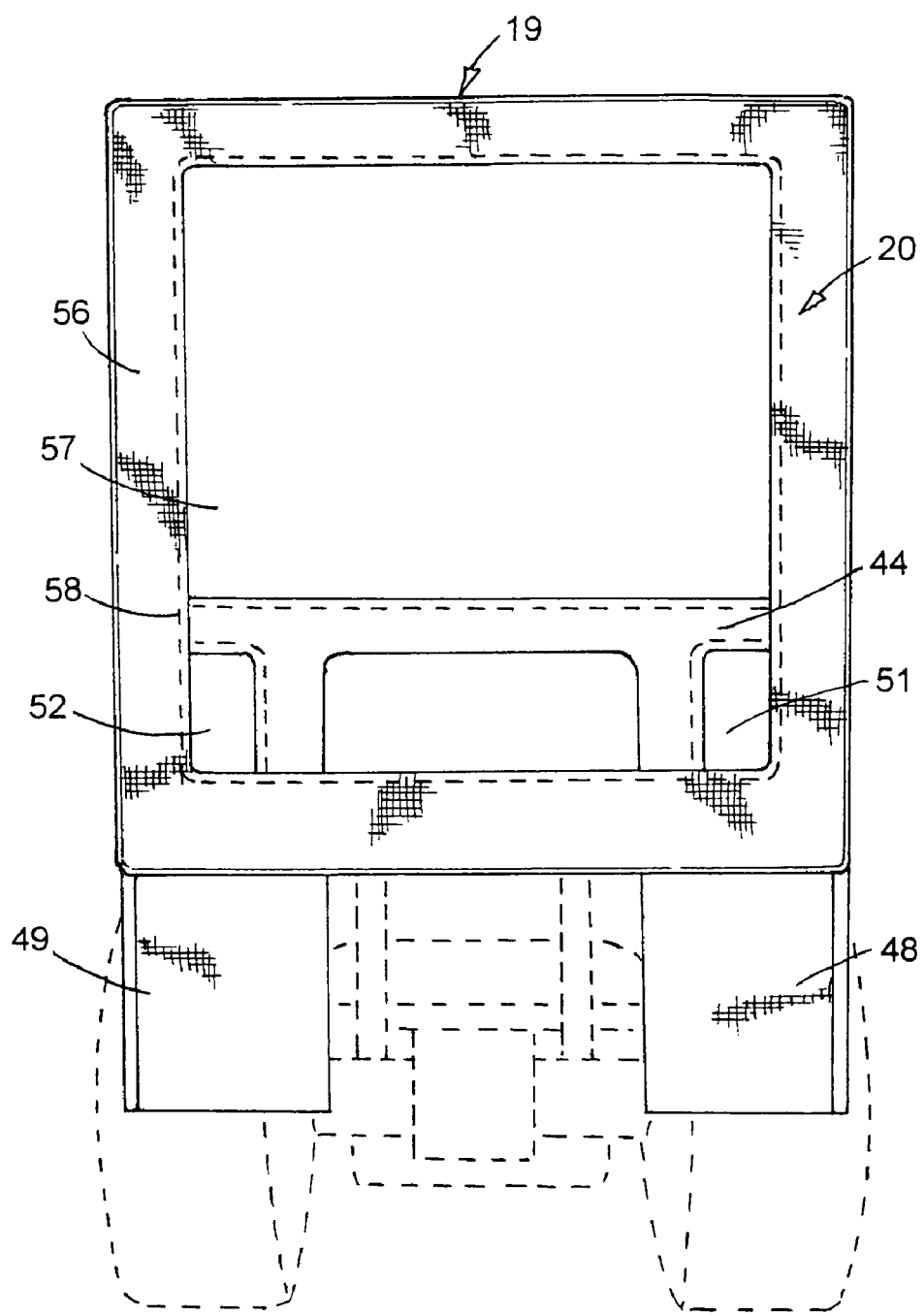
FIG. 5 is a rear elevational view thereof.

Rear panel 20, shown in FIG. 5, has an upright generally square panel section 56 surrounding a generally square window 57 of transparent plastic sheet material. Fasteners 58, shown as stitches, secure window 57 to panel section 56. Other types of fasteners can be used to secure window 57 to panel section 56.

Figure 6:
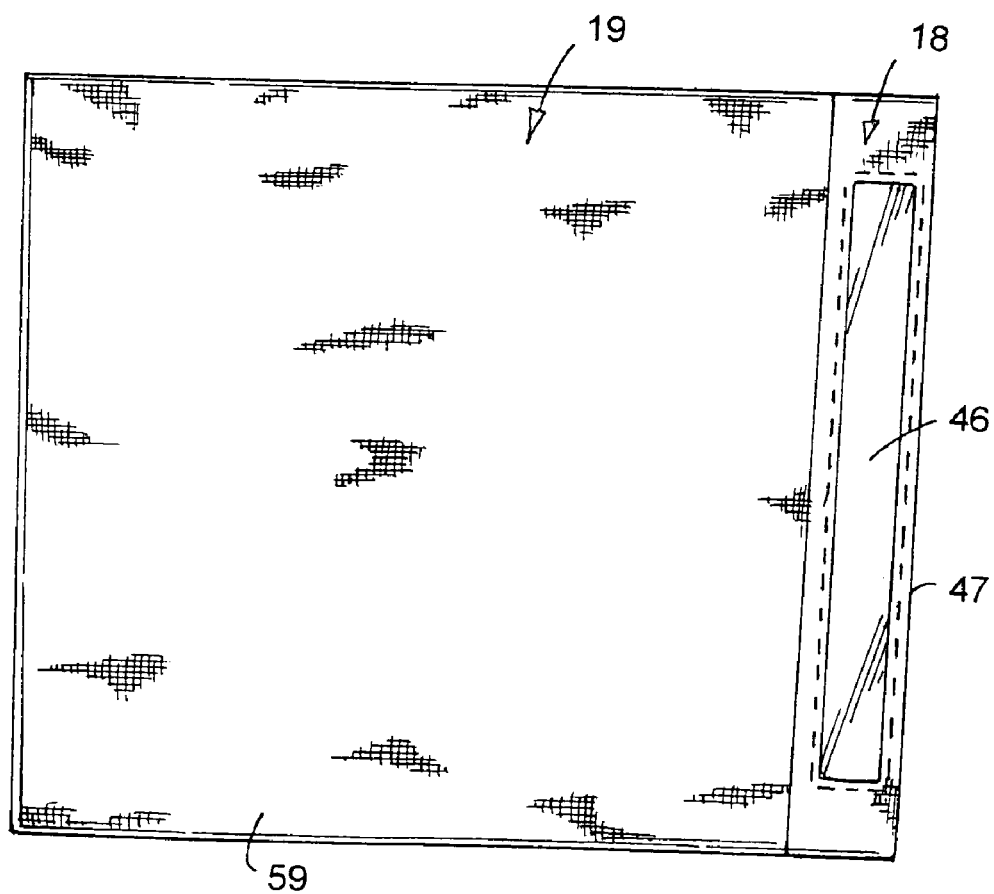
FIG. 6 is a top plan view thereof.
Figure 9:
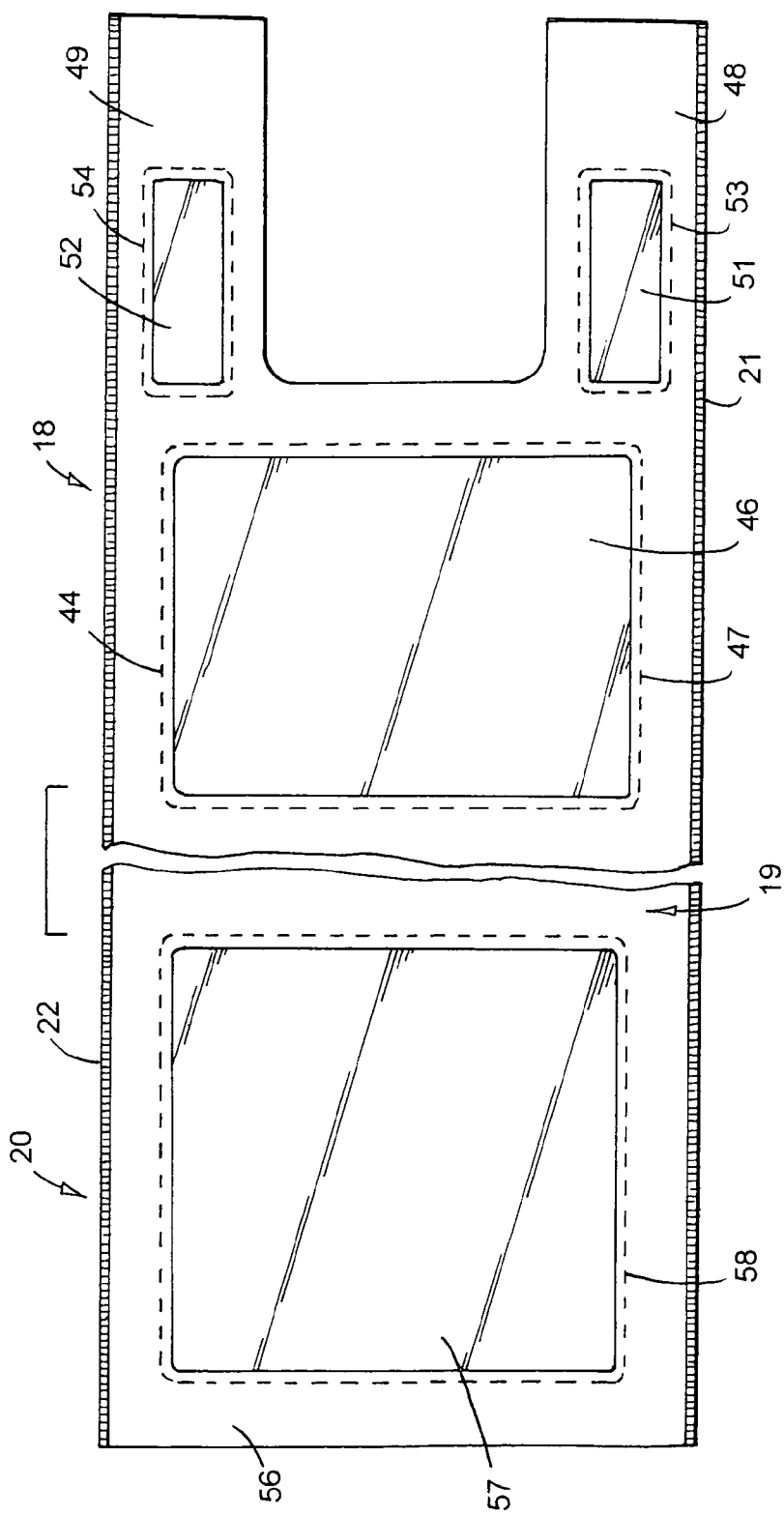
FIG. 9 is a top plan view of the front, top and rear panel assembly in an expanded horizontal position.

Top panel 19, shown in FIG. 6, is continuous one-piece panel section or sheet member 59 joined at opposite ends to front panel 18 and rear panel 20. The panel section 44 of front panel 18 and panel section 56 of rear panel 20 is integral with sheet member 59. Panel sections of panels 16 to 20 are water repellant sheet material with clear plastic sheet windows. The sheet material is a strong durable vinyl plastic, canvas, cloth or fiber reinforced plastic sheets.

Figure 10:
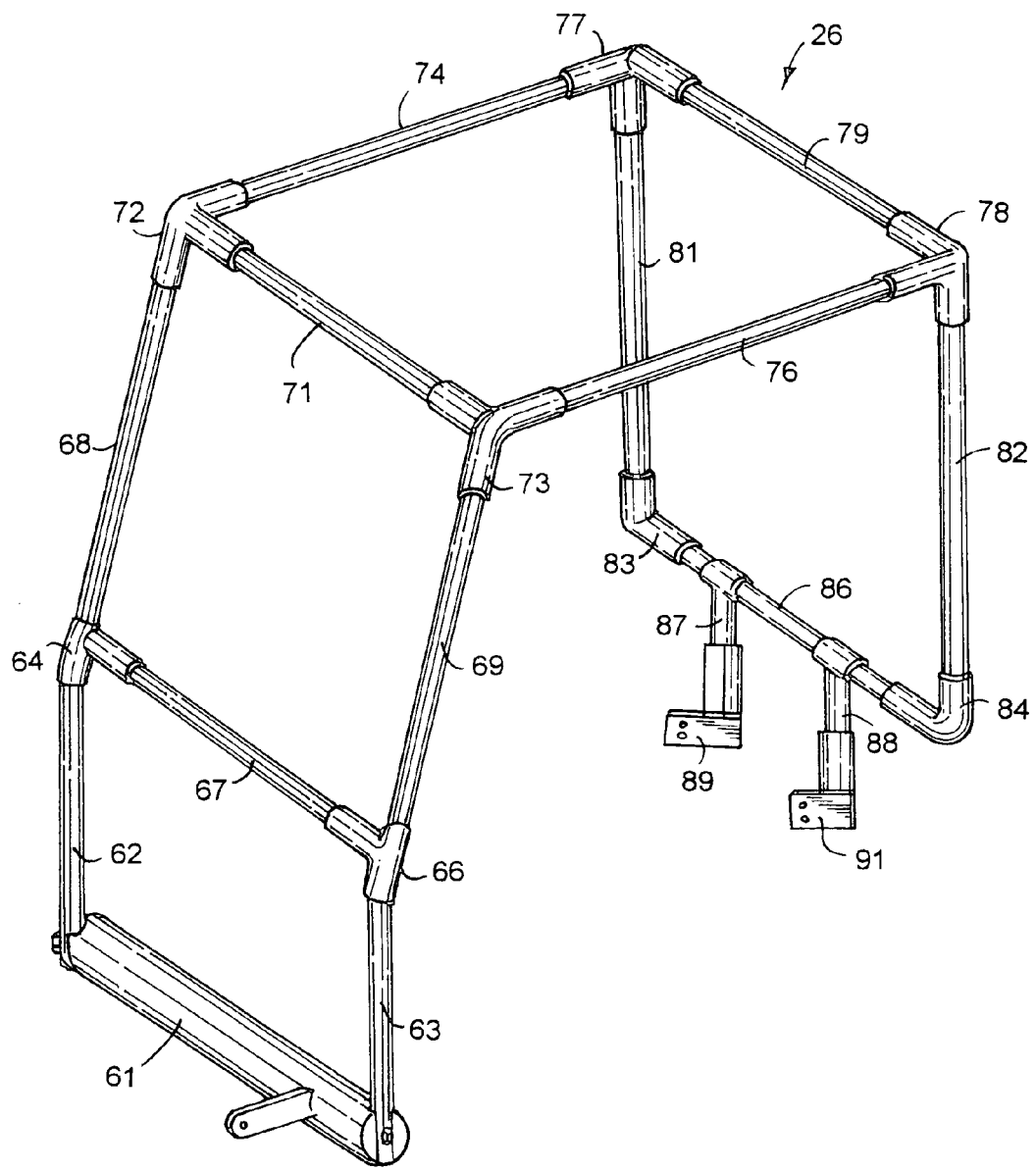
FIG. 10 is a perspective view of the frame assembly mountable on a garden tractor for supporting the enclosure.

As shown in FIG. 10, frame assembly 26 for supporting enclosure 10 on vehicle 11 has a front mount bar 61 and rear mount brackets 89 and 91 adopted to be secured to the vehicle's frame. Bar 61 is connected to lower front tubes 62 and 63 located adjacent opposite sides of the vehicle's hood 12. A pair of L-shaped connectors 64 and 66 joined with a horizontal cross tube 67 are attached to upward and rearward inclined upper front tubes 68 and 69. Tubes 62 and 68 are a single tubular member. Tube 63 and 69 are also a single tubular member. The upper ends of tubes 68 and 69 are joined to corner connectors 72 and 73. An upper horizontal cross tube 71 is attached to corner connectors 72 and 73. A pair of top horizontal tubes 74 and 76 extend between and are attached to front corner connectors 72 and 73 and right angle rear corner connectors 77 and 78. A horizontal rear cross tube 79 is attached to corner connectors 77 and 78. Rear tubes 81 and 82 extend downward frame corner connectors 77 and 78 to elbow connectors 83 and 84 which are joined with a lower rear crossbar 86. Mount tubes 87 and 88 retained on cross bar 86 telescope downward into rear mount brackets 89 and 91. The tubes are cylindrical tubular metal or plastic members with ends that telescope into the tubular connectors. The ends of the tubes can be threaded into the tubular connectors. The tubes can be metal or plastic elongated square tubular members. Frame assembly 26 can be removed from vehicle 11 by separating front mount bar 61 and rear mount brackets 89 and 91 from the frame of vehicle 11. Fasteners such as bolts are used to secure mount bar 61 and brackets 89 and 91 to the frame of vehicle 11. Other types of mounts can be used to connect frame assembly 26 to vehicle 11.

Figure 11:
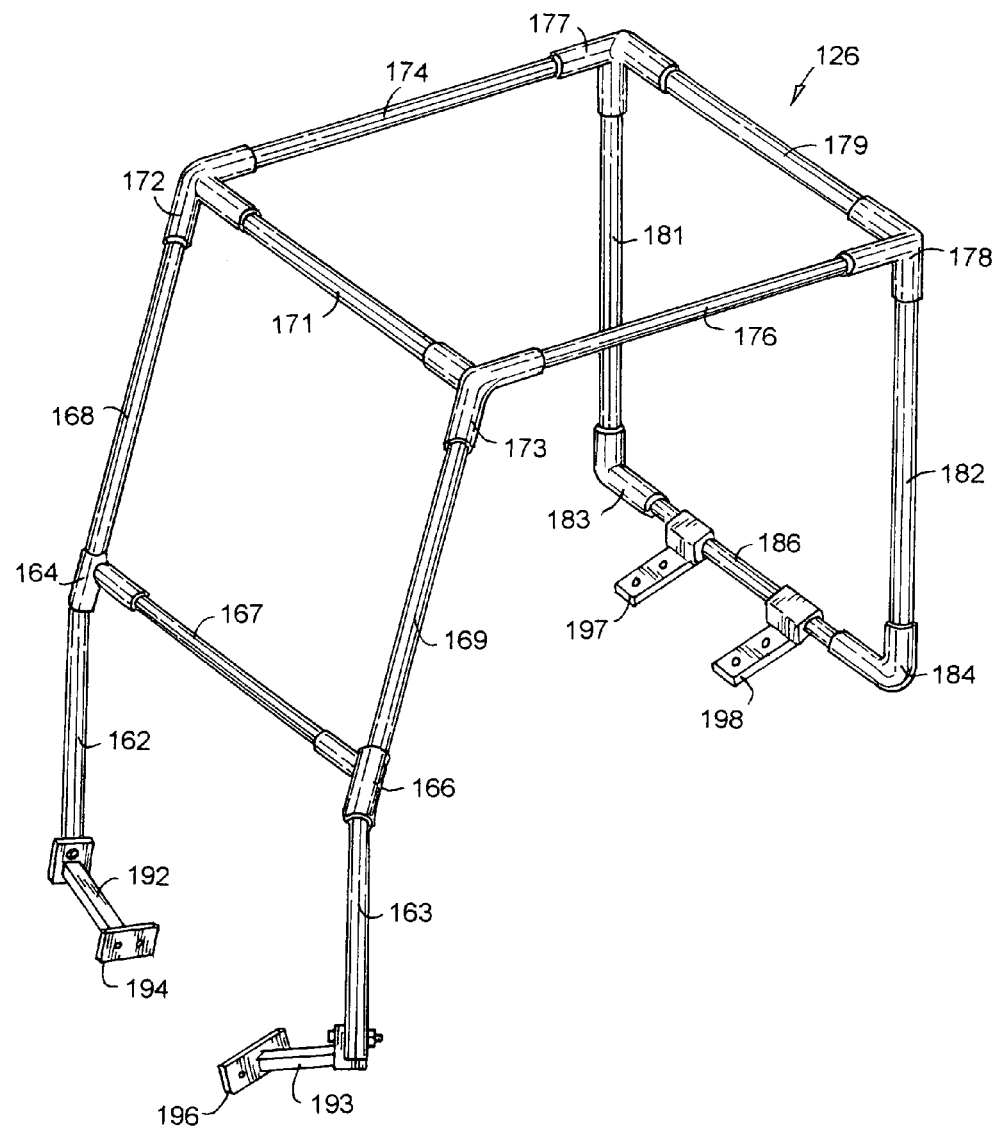
FIG. 11 is a perspective view of a modification of the frame assembly mountable on a garden tractor for supporting the enclosure.

An alternative frame assembly 126 for supporting enclosure 10 on vehicle 11, shown in FIG. 11, has the same tubes and connectors disclosed in FIG. 10. The tubes and connectors disclosed in FIG. 11 that correspond to the tubs and connectors disclosed in FIG. 10 have the same reference number with the prefix 1. Front mount brackets 192 and 193 are inwardly directed linear members or bars connected to the lower ends of front tubes 162 and 163. Plates 194 and 196 secured to the inner end of bars accommodate bolts that fasten brackets to opposite sides of the frame of vehicle 11. Rear mount brackets 197 and 198 extend forwardly from cross tube 186 have flat bars with holes for bolts that secure brackets 197 and 198 to the rear of vehicle 11. Other types of brackets and fasteners can be used to mount frame assembly 126 on vehicle 11.

Figure 12:
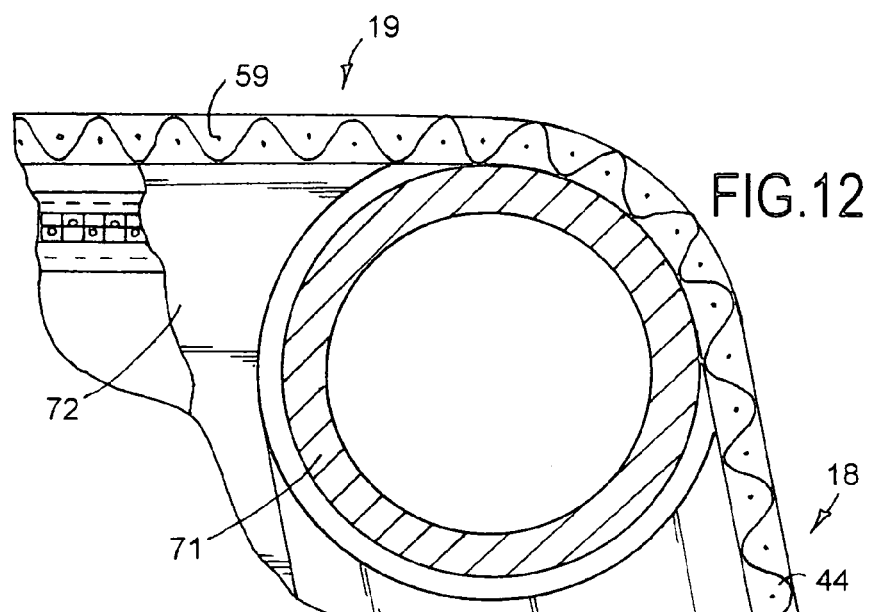
FIG. 12 is an enlarged sectional view taken along line 12-12 of FIG. 4.
Figure 13:
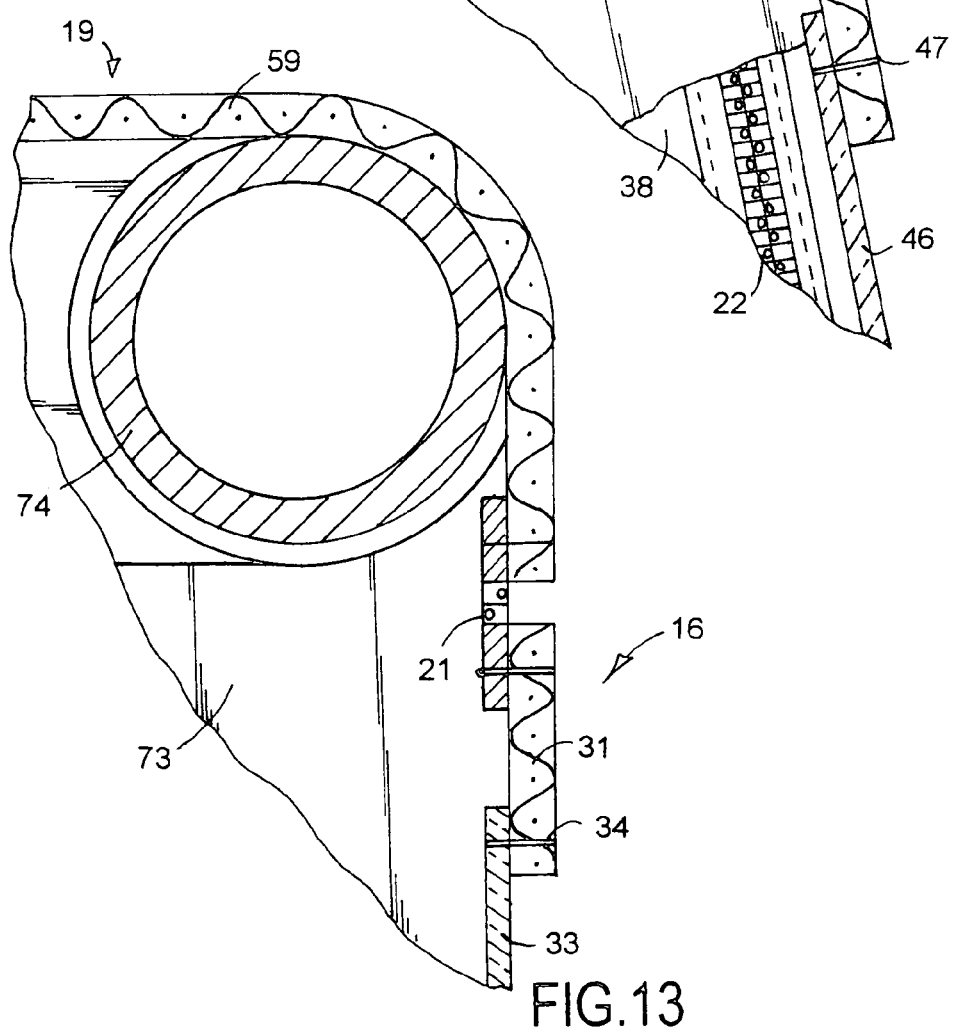
FIG. 13 is an enlarged sectional view taken along line 13-13 of FIG. 2.

As shown in FIGS. 12 and 13, top panel 19 extended around cross tubes 71 and 74 of frame assembly 26. The rear section and opposite side sections of top panel 19 extend around tubes 74, 76 and 79 to retain top panel 19 in a generally flat horizontal location on frame assembly 26. Releasable fasteners 21 and 22 connect side panels 16 and 17 to front, top and rear panels 18, 19 and 20. The releasable fasteners 21 and 22 are manually operated to easily install and remove enclosure 10 from frame assembly 26 without requiring modification, drilling or cutting of any enclosure panels. When releasable fasteners 21 and 22 are separated, side panels 16 and 17 can be removed from front top and rear panels 18, 19 and 20 allowing panels 18, 19 and 20 to be removed from frame assembly 26. Panels 18, 19 and 20 can then be folded or rolled into a configuration for transport and storage with side panels 16 and 17. Frame assembly 26 removed from vehicle 11 by disconnecting mount bar 61 and mount brackets 89 and 91 from vehicle 11. The tubes 62, 63, 68, 69, 71, 74, 76, 79, 81, 82 and 86 can be separated from associated connectors to allow compact storage of frame assembly 26.

While the invention has been shown and described with reference to an enclosure and frame assembly, persons skilled in the art can make change and modifications of materials, structure and arrangements of structure without departing from the invention. The invention is embodied in the following claims.

The invention claimed is:

1. A frame assembly mountable on a tractor and an enclosure supported on the frame assembly comprising:
a frame assembly having upright front members, generally horizontal top members and upright rear members, and connectors joining the front members to the top members and the rear members to the top members,
at least one first mount connected to the front members adapted to be attached to the tractor,
at least one second mount connected to the rear members adapted to be attached to the tractor,
an enclosure supported on the front, top and rear members of the frame assembly to provide an operator's compartment for the tractor's operator, said enclosure having a front panel, a top panel and a rear panel located on said front, top and rear members of the frame assembly,
a first side panel,
a first releasable fastener securing the first side panel to the front, top and rear panels,
a second side panel, and
a second releasable fastener securing the second side panel to the front, top and rear panels,
said first and second side panels retaining the front, top and rear panels on the frame assembly.

2. The frame assembly and enclosure of claim 1 including: transparent windows secured to the front and rear panels and side panels of the enclosure.

3. The frame assembly and enclosure of claim 1 wherein: the front panel of the enclosure includes downwardly extended sections and windows secured to each downwardly extended section.

4. The frame assembly and enclosure of claim 1 wherein: the first and second releasable fasteners are each continuous zippers.

5. The frame assembly and enclosure of claim 1 wherein: the front, top and rear panels of the enclosure are a one-piece sheet member.

6. The frame assembly and enclosure of claim 1 wherein: the front, top and rear panels have first and second edges, the first releasable fastener is a continuous first zipper securing the first side panel to the first side edges of the front, top and rear panels and the second releasable fastener is a continuous second zipper securing the second side panel to the second side edges of the front, top and rear panels.

7. The frame assembly and enclosure of claim 1 wherein: the second side panel includes a door to allow the operator of the tractor to enter and exit from the operator's compartment.

8. The frame assembly and enclosure of claim 1 wherein: the second side panel includes a third releasable fasteners providing a door to allow the operator of the tractor to enter and exit from the operator's compartment.

9. The frame assembly and enclosure of claim 8 including: a transparent window secured to said door.

10. A frame mountable on the tractor and an enclosure supported on the frame comprising:
a frame,
mounts connected to the frame adapted to be attached to the tractor,
an enclosure supported on the frame to provide an operator's compartment for the tractor's operator, said enclosure including a front panel, a top panel, and a rear panel located on said frame
a first side panel,
a first releasable fastener securing the first side panel to the front, top and rear panels,
a second side panel, and
a second releasable fastener securing the second side panel to the front, top and rear panels,
said first and second side panels retaining the front, top and rear panels on the frame.

11. The frame and enclosure of claim 1 including: transparent windows secured to the front and rear panels and side panels of the enclosure.

12. The frame and enclosure of claim 10 wherein: the front panel of the enclosure includes downwardly extended sections and windows secured to each downwardly extended section.

13. The frame assembly and enclosure of claim 10 wherein: the first and second releasable fasteners are each continuous zippers.

14. The frame assembly and enclosure of claim 10 wherein:

the front, top and rear panels of the enclosure are a one-piece sheet member.

15. The frame assembly and enclosure of claim 10 wherein:
the front, top and rear panels have first and second edges, the first releasable fastener is a continuous first zipper securing the first side panel to the first side edges of the front, top and rear panels and the second releasable fastener is a continuous second zipper securing the second side panel to the second side edges of the front, top and rear panels.

16. The frame assembly and enclosure of claim 10 wherein:
the second side panel includes a door to allow the operator of the tractor to enter and exit from the operator's compartment.

17. The frame assembly and enclosure of claim 10 wherein:
the second side panel includes a third releasable fasteners providing a door to allow the operator of the tractor to enter and exit from the operator's compartment.

18. The frame assembly and enclosure of claim 17 including:
a transparent window secured to said door.

19. An enclosure for a tractor supporting a frame assembly mounted on the tractor and located about the tractor's operator's space comprising:
a front panel having a peripheral section surrounding a front opening, a transparent first window located in said front opening,
a fastener securing the window to said peripheral section of the front panel,
a rear panel having a peripheral section surrounding a rear opening;
a transparent second window located in said rear opening;
a fastener securing the second window to the peripheral section of the rear panel,
a top panel joined to the front and rear panels,
a first side panel having a first side opening and opposite sides and top peripheral edges,
a transparent first side window located in the first side opening,
a fastener securing the first side window to the first side panel,
a first releasable fastener connecting one side edge of the first side panel to the front panel, the top edge to the top panel and the other side edge of the first panel to the rear panel,
a second side panel having a second side opening and opposite sides and top peripheral edges,
a transparent second side window located in second side opening,
a fastener securing the second side windows to the second side panel,
a second releasable fastener connecting one side edge of the second side panel to the front panel, the top edge to the top panel and the other side edges of the second panel to the rear panel, and
a third releasable fastener on the second side panel laterally spaced inwardly from the second releasable fastener to provide a door to allow an operator of the tractor to enter and exit from the tractor's operator's space.

20. The enclosure of claim 19 wherein:
the first, second and third releasable fasteners are zippers.

21. The enclosure of claim 19 wherein:
the front, top and rear panels are a one-piece sheet member.

22. The enclosure of claim 19 wherein:
the top panel is a flexible one-piece sheet member.

23. The enclosure of claim 19 wherein:
the front, top and rear panels have first and second side edges,
the first releasable fastener is a continuous first zipper securing the first side panel to the first side edges of the front, top and rear panels and
the second releasable fastener is a continuous second zipper securing the second side panel to the second side edges of the front, top and rear panels.

24. The enclosure of claim 19 wherein:
said front panel includes downwardly extended sections joined to the peripheral section below said first window,
each downwardly extended section having an opening, a transparent window located in each opening, and fasteners securing each transparent window to a downwardly extended section of the front panel.

25. The enclosure of claim 24 wherein:
each downwardly extended section has a generally rectangular shape and each window has a generally rectangular shape.

* * * * *